United States Patent
Cho et al.

(10) Patent No.: US 9,523,886 B2
(45) Date of Patent: Dec. 20, 2016

(54) BACKLIGHT UNIT HAVING REFLECTIVE/TRANSMISSIVE LENS AND DISPLAY DEVICE HAVING THE SAME

(71) Applicant: Samsung Electronics Co., Ltd., Suwon-si (KR)

(72) Inventors: Byoung Jin Cho, Anyang-si (KR); Young Chol Lee, Hwaseong-si (KR); Young Man Ahn, Suwon-si (KR); Joon Seok Ahn, Suwon-si (KR); Nae Won Jang, Seongnam-si (KR); Hyeong Sik Choi, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 342 days.

(21) Appl. No.: 14/220,668

(22) Filed: Mar. 20, 2014

(65) Prior Publication Data

US 2014/0286000 A1 Sep. 25, 2014

(30) Foreign Application Priority Data

Mar. 21, 2013 (KR) ........................ 10-2013-0030090

(51) Int. Cl.
| | |
|---|---|
| *F21S 4/00* | (2016.01) |
| *G02F 1/1335* | (2006.01) |
| *G02B 19/00* | (2006.01) |

(52) U.S. Cl.
CPC ..... *G02F 1/133606* (2013.01); *G02B 19/0028* (2013.01); *G02B 19/0066* (2013.01);
(Continued)

(58) Field of Classification Search
CPC ...... F21V 7/0066; F21V 7/0016; F21V 7/043; F21V 13/04; F21Y 2103/003; F21S 4/20; F21S 4/28; G02F 1/133603; G02F 1/133605; G02F 2001/133607; G02F 2013/0422; G02F 13/08; G09F 13/0409
(Continued)

(56) References Cited

U.S. PATENT DOCUMENTS 2,683,394 A * 7/1954 Polanyi .............. G02B 17/0808
348/784
3,553,869 A * 1/1971 Dickinson ............... G09F 13/08
40/559
(Continued)

FOREIGN PATENT DOCUMENTS

| KR | 10-2006-0000765 | 1/2006 |
| KR | 10-2009-0083056 | 8/2009 |
| KR | 10-2012-0058928 | 6/2012 |

OTHER PUBLICATIONS

International Search Report dated Jun. 26, 2014 in International Patent Application No. PCT/KR2014/002171.
(Continued)

*Primary Examiner* — Ismael Negron
(74) *Attorney, Agent, or Firm* — Staas & Halsey LLP (57) ABSTRACT

A backlight unit includes a light source and a lens unit optically coupled to the light source. A surface of the lens unit facing the light source includes areas coated with a reflective material for reflecting light from the light source away from the lens, and a transmissive area for transmitting light from the light source towards ran output surface of the lens. A display device includes a display panel, a light diffuser, the backlight unit and a reflective element, the backlight unit arranged between the light diffuser and the reflective element, and the display panel positioned opposite the backlight unit with respect to the light diffuser.

30 Claims, 11 Drawing Sheets

(52) U.S. Cl.
CPC .. *G02F 1/133605* (2013.01); *G02F 1/133603* (2013.01); *G02F 2001/133607* (2013.01)

(58) Field of Classification Search
IPC .......................................... F21V 7/0066,7/0016
See application file for complete search history.

(56) References Cited

U.S. PATENT DOCUMENTS

| | | | | |
|---|---|---|---|---|
| 4,418,378 A * | 11/1983 | Johnson | ................... | F21V 9/08 362/217.08 |
| 6,416,201 B1 * | 7/2002 | Strand | ..................... | G09F 13/04 362/223 |
| 6,536,923 B1 * | 3/2003 | Merz | ..................... | F21S 48/215 362/245 |
| 7,033,061 B1 * | 4/2006 | Wu | .......................... | F21V 5/00 359/599 |
| 7,114,838 B2 * | 10/2006 | Wu | .......................... | F21V 5/04 257/E33.059 |
| 7,507,001 B2 * | 3/2009 | Kit | .......................... | F21K 9/17 315/51 |
| 7,800,122 B2 * | 9/2010 | Chiu | ....................... | H01L 33/20 257/98 |
| 8,093,823 B1 * | 1/2012 | Ivey | .......................... | F21K 9/17 315/246 |
| 8,388,177 B2 * | 3/2013 | Park | .......................... | F21K 9/00 362/235 |
| 2007/0236934 A1 * | 10/2007 | Chang | ....................... | F21K 9/00 362/294 |
| 2011/0149548 A1 * | 6/2011 | Yang | ....................... | F21V 5/04 362/84 |

OTHER PUBLICATIONS

Extended European Search Report dated Jul. 3, 2014 in European Patent Application No. 14160357.1.

* cited by examiner

| | PERSPECTIVE VIEW | CROSS-SECTIONAL VIEW |
|---|---|---|
| FIRST MODIFIED EMBODIMENT | | |
| SECOND MODIFIED EMBODIMENT | | |
| THIRD MODIFIED EMBODIMENT | | |
| FOURTH MODIFIED EMBODIMENT | | |
| FIFTH MODIFIED EMBODIMENT | | |
| SIXTH MODIFIED EMBODIMENT | | |

BACKLIGHT UNIT HAVING REFLECTIVE/TRANSMISSIVE LENS AND DISPLAY DEVICE HAVING THE SAME

CROSS-REFERENCE TO RELATED APPLICATIONS

This application claims the priority benefit of Korean Patent Application No. 10-2013-0030090, filed on Mar. 21, 2013 in the Korean Intellectual Property Office, the disclosure of which is incorporated herein by reference.

BACKGROUND

1. Field

The following description relates to a display device having a backlight unit which radiates light to a display panel.

2. Description of the Related Art

A display panel using a liquid crystal display (LCD), which is common in display devices, does not emit light directly. Therefore, a backlight unit is provided at the rear of the display panel, and a light diffuser or a light guide plate is installed between the display panel and the backlight unit, so that light radiated from the backlight unit may be diffused through the light diffuser to be uniformly distributed to the entirety of the display panel.

Display devices are divided into a direct type and an edge type according to the positions of backlight units. A direct type display device has a structure in which a plurality of light emitting diodes is broadly arranged at the rear of a display panel and thus directly radiate light to the display panel. An edge type display device has a structure in which a plurality of light emitting diodes is arranged at the edge of a display panel and light radiated from the plurality of light emitting diodes is diffused by a light guide plate and then transmitted to the display panel.

In the above conventional direct type display device, if a distance between the display panel and the backlight unit is excessively short, light radiated from the respective light emitting diodes may form a hot spot on the display panel. In order to prevent formation of a hot spot, a distance between the display panel and the backlight unit should be sufficient, and thus, the thickness of the display device is increased and slimming of a product is limited. The edge type display device may be advantageous in terms of slimming of the display device, as compared to the direct type display device, but additionally requires the light guide plate to guide light radiated from the light emitting diodes at the edge of the display panel to the central region of the display panel, and may be thus disadvantageous in terms of price competitiveness.

SUMMARY

Therefore, the following description relates to a display device using a display panel in which a backlight unit to radiate light to the display panel is installed at the central region of the rear surface of the display panel to reduce the number of optical elements of the backlight unit, and the structure of a lens unit of the backlight unit is improved to eliminate a dark region formed on the display panel due to the shadow of the backlight unit.

Additional aspects of the invention will be set forth in part in the description which follows and, in part, will be obvious from the description, or may be learned by practice of the invention.

In accordance with an aspect of the present disclosure, a backlight unit of a display device includes a light source installed at a position, separated from the central region of a light diffuser diffusing light by a predetermined distance, to radiate light to the light diffuser, and a lens unit installed between the light diffuser and the light source and having a surface facing the light source, the surface of the lens unit facing the light source including reflective areas which are coated with a reflective material and reflect a part of light radiated from the light source, and a transmissive area which is not coated with a reflective material and transmits the other part of light radiated from the light source.

The light source may include a plurality of optical elements, the plurality of optical elements may be arranged in a long strip shape in parallel with the light diffuser, and the lens unit may be arranged in a long strip shape along the arrangement shape of the plurality of optical elements.

The plurality of optical elements may be arranged in one of the vertical direction and the horizontal direction of the light diffuser.

The plurality of optical elements may be arranged in the shape of two parallel strips in the vertical direction of the light diffuser, and the lens unit may be arranged in the shape of two parallel strips along the arrangement shape of the plurality of optical elements.

The plurality of optical elements may be arranged in the shape of two parallel strips in the vertical direction of the light diffuser, and the plurality of optical elements in the shape of the two parallel strips may be arranged in a zigzag pattern.

The lens unit may have the surface facing the light source, the transmissive area may be formed along the central axis in the lengthwise direction of the surface of the lens unit facing the light source to have predetermined width and length, and the reflective areas may be formed at both sides of the transmissive area.

The reflective areas may include a first reflective area and a second reflective area divided from each other by the transmissive area, and the first reflective area and the second reflective area may be inclined symmetrically to each other.

The first reflective area and the second reflective area may be inclined in the direction of the light diffuser.

The reflective areas on the surface of the lens unit facing the light source may have a predetermined curvature.

The lens unit may have a surface facing the light diffuser, and the surface of the lens unit facing the light diffuser may be flat.

The lens unit may have a surface facing the light diffuser, and some parts of the surface of the lens unit facing the light diffuser may be concave.

The positions of the concave parts may coincide with the positions of a plurality of optical elements of the light source.

The size of the concave parts may coincide with the size of a plurality of optical elements of the light source.

The size of the concave parts may be greater than or smaller than the size of a plurality of optical elements of the light source.

The lens unit may have a surface facing the light diffuser, and some parts of the surface of the lens unit facing the light diffuser may be convex.

The positions of the convex parts may coincide with the positions of a plurality of optical elements of the light source.

The size of the convex parts may coincide with the size of a plurality of optical elements of the light source.

The size of the convex parts may be greater than or smaller than the size of a plurality of optical elements of the light source.

The lens unit may have a surface facing the light diffuser, and the entirety of surface of the lens unit facing the light diffuser may be convex.

The lens unit may have a surface facing the light diffuser, and the entirety of surface of the lens unit facing the light diffuser may be concave.

The lens unit may have a surface facing the light diffuser, and a long and concave groove may be formed on the surface of the lens unit facing the light diffuser in the lengthwise direction of the lens unit.

The lens unit may have a surface facing the light diffuser, and a long and convex groove may be formed on the surface of the lens unit facing the light diffuser.

The lens unit may include a plurality of optical elements, and the lens unit may be provided to correspond to the plurality of optical elements.

In accordance with an aspect of the present disclosure, a display device includes a display panel to display an image, a light diffuser installed at the rear of the display panel to diffuse light, a bottom chassis installed at the rear of the light diffuser and provided with a reflective surface on a surface of the bottom chassis facing the light diffuser, a light source installed between the light diffuser and the bottom chassis to be separated from the central region of the light diffuser by a predetermined distance, and radiating light to the light diffuser, and a lens unit installed between the light diffuser and the light source and having a surface facing the light source, the surface of the lens unit facing the light source including reflective areas which are coated with a reflective material and reflect a part of light radiated from the light source, and a transmissive area which is not coated with a reflective material and transmits the other part of light radiated from the light source.

A part of light radiated from the light source may be reflected by the reflective areas of the lens unit, and then reflected by the reflective surface of the bottom chassis.

The light source may include a plurality of optical elements, the plurality of optical elements may be arranged in a long strip shape in parallel with the rear surface of the light diffuser, and the lens unit may be arranged in a long strip shape along the arrangement shape of the plurality of optical elements.

The lens unit may have the surface facing the light source, the transmissive area may be formed along the central axis in the lengthwise direction of the surface of the lens unit facing the light source to have predetermined width and length, and the reflective areas may be formed at both sides of the transmissive area.

The lens unit may include a plurality of optical elements, and the lens unit may be provided to correspond to the plurality of optical elements.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
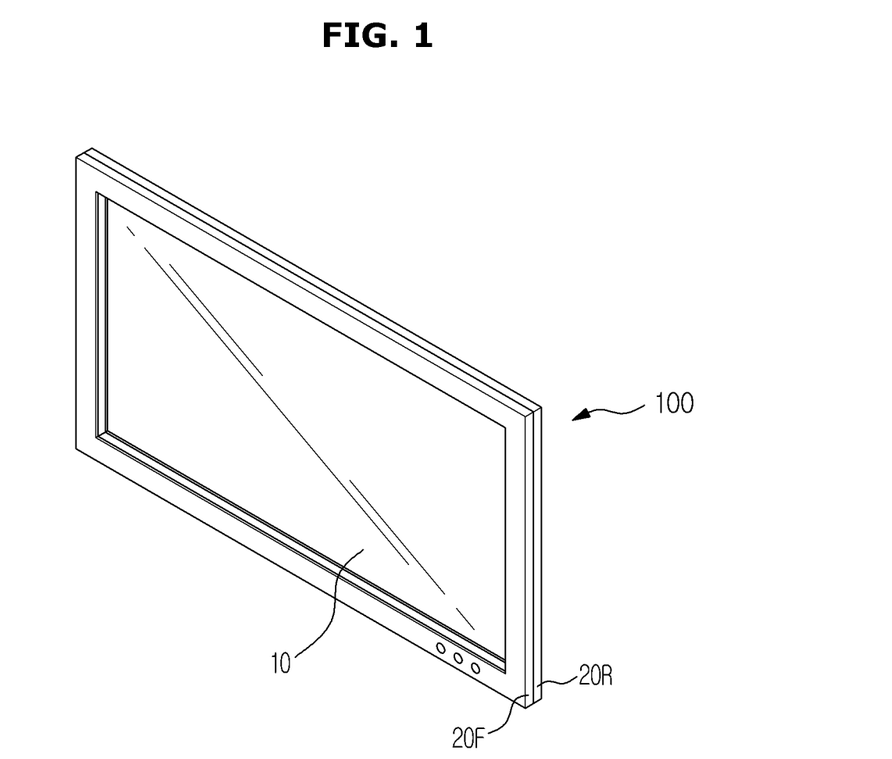
FIG. 1 is a perspective view of a display device in accordance with an embodiment of the present disclosure.

FIG. 1 is a perspective view of a display device in accordance with an embodiment of the present disclosure. As exemplarily shown in FIG. 1, a display device 100 includes a display module 10, and a front case 20F and a rear case 20R forming the external appearance of the display device 100 and supporting and protecting the display module 10.

Figure 2:
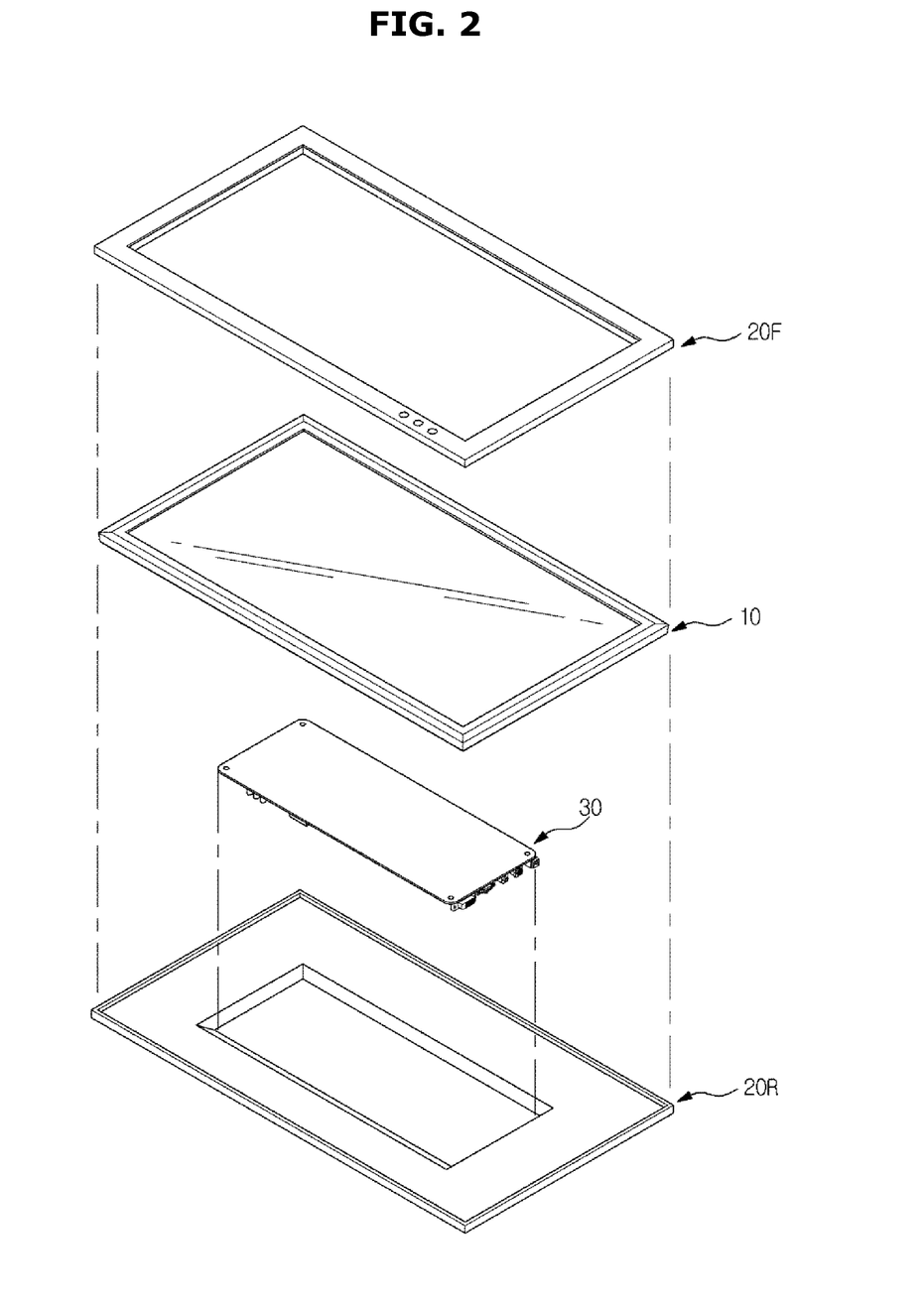
FIG. 2 is an exploded perspective view of the display device in accordance with the embodiment of the present disclosure.

FIG. 2 is an exploded perspective view of the display device in accordance with the embodiment of the present disclosure. As exemplarily shown in FIG. 2, the display device 100 in accordance with the embodiment of the present disclosure includes the display module 10 displaying an image, the front case 20F and the rear case 20R provided in front of and at the rear of the display module 10 and combined with each other, and a control substrate 30 disposed between the display module 10 and the rear case 20R to supply power and transmit a control signal to the display module 10.

Figure 3:
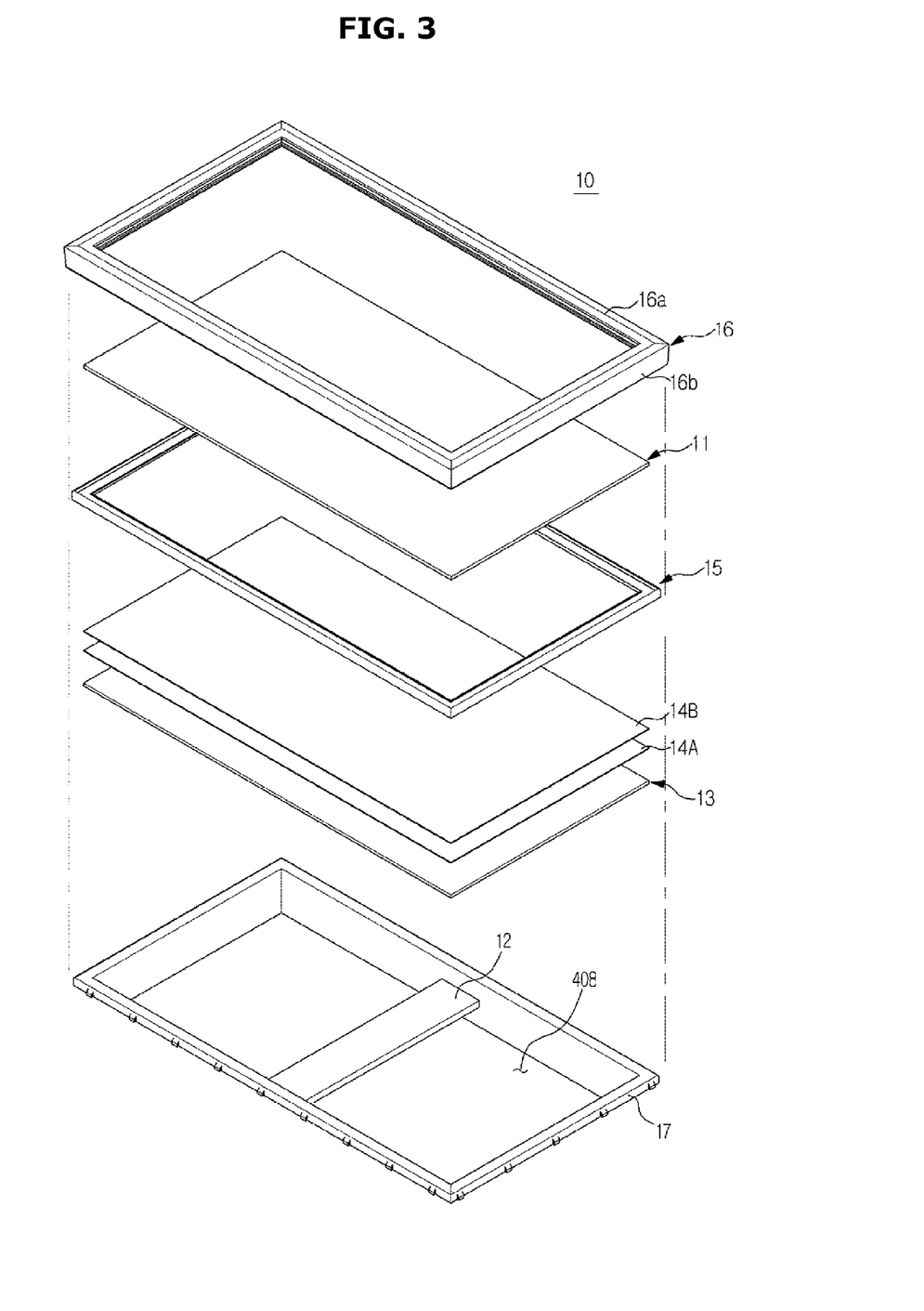
FIG. 3 is an exploded perspective view of a display module shown in FIG. 2.
Figure 4:
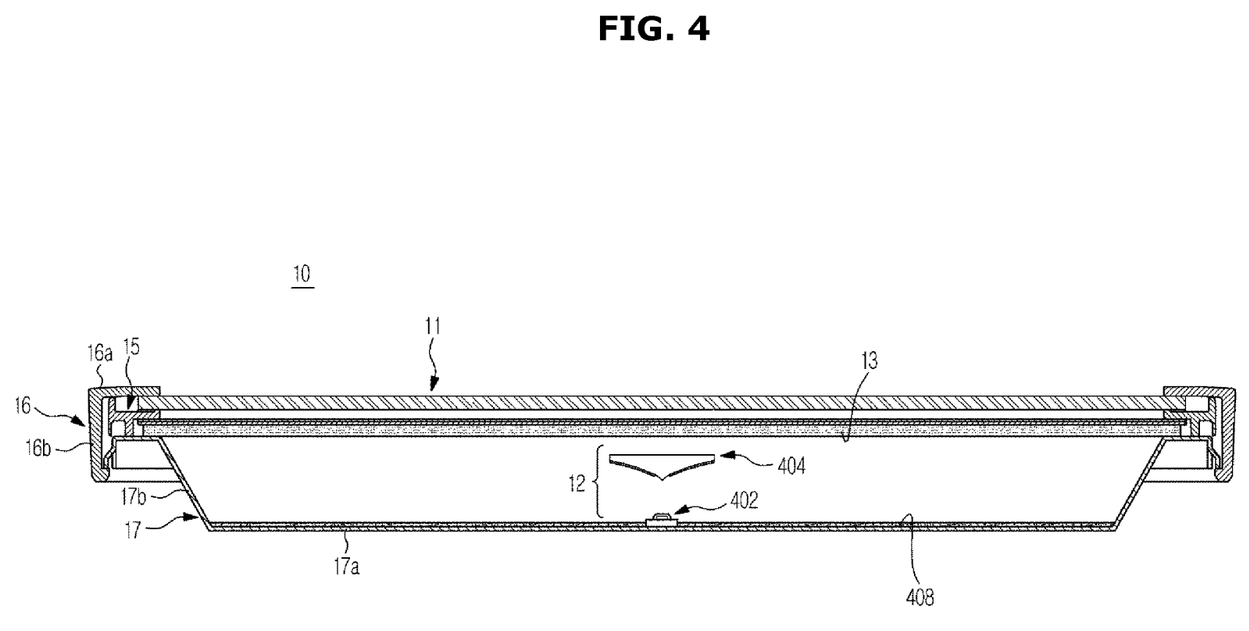
FIG. 4 is a cross-sectional view of the display module shown in FIG. 2.

FIG. 3 is an exploded perspective view of the display module 10 shown in FIG. 2, and FIG. 4 is a cross-sectional view of the display module 10 shown in FIG. 2. As exemplarily shown in FIGS. 3 and 4, the display module 10 of the display device 100 in accordance with the embodiment of the present disclosure includes a display panel 11 including a liquid crystal display and displaying an image, a backlight unit 12 disposed at the rear of the display panel 11 to be separated from the display panel 11 and radiating light to the display panel 11, a light diffuser 13 to diffuse light radiated from the backlight unit 12, and a plurality of optical sheets 14A and 14B disposed on the rear surface of the display panel 11.

Further, the display module 10 includes a middle mold 15 supporting the display panel 11 and the light diffuser 13, a top chassis 16 installed in front of the middle mold 15 and maintaining the fixed state of the display panel 11 to the middle mold 15, and a bottom chassis 17 installed at the rear of the middle mold 15 such that the backlight unit 12 is installed on the bottom chassis 17. The optical sheets 14A and 14B include a prism film 14A focusing light diffused by the light diffuser 13 in a direction vertical to the display panel 11, and a protective film 14B to protect the prism film 14A. The display panel 11 is disposed in front of the middle mold 15, the light diffuser 13 is disposed at the rear of the middle mold 15, and the display panel 11 and the light diffuser 13 are supported by the middle mold 15. The top chassis 16 includes a bezel part 16a covering the edge of the front surface of the display panel 11, and a top side part 16b bent backward from the edge of the bezel part 16a. The bottom chassis 17 includes a rear surface part 17a formed in an about rectangular shape such that the backlight unit 12 is seated on the rear surface part 17a, and a bottom side part 17b extending forward from the edge of the rear surface part 17a.

A reflective surface 408 reflecting light radiated from the backlight unit 12 to proceed toward the light diffuser 13 is formed on the inner surfaces (i.e., the surfaces facing the light diffuser 13) of the rear surface part 17a and the bottom side part 17b. For this purpose, the inner surface of the bottom chassis 17 is coated with a reflective material. Otherwise, a reflective plate reflecting light radiated from the backlight unit 12 toward the light diffuser 13 may be additionally installed between the bottom chassis 17 and the backlight unit 12. The backlight unit 12 includes a light source 402 and a lens unit 404. The light source 402 serves to radiate light and the lens unit 404 serves to uniformly transmit light radiated from the light source 402 to the entirety of the light diffuser 13. The structure of such a backlight unit 12 will be described in detail below with reference to FIGS. 5 and 6.

Figure 5:
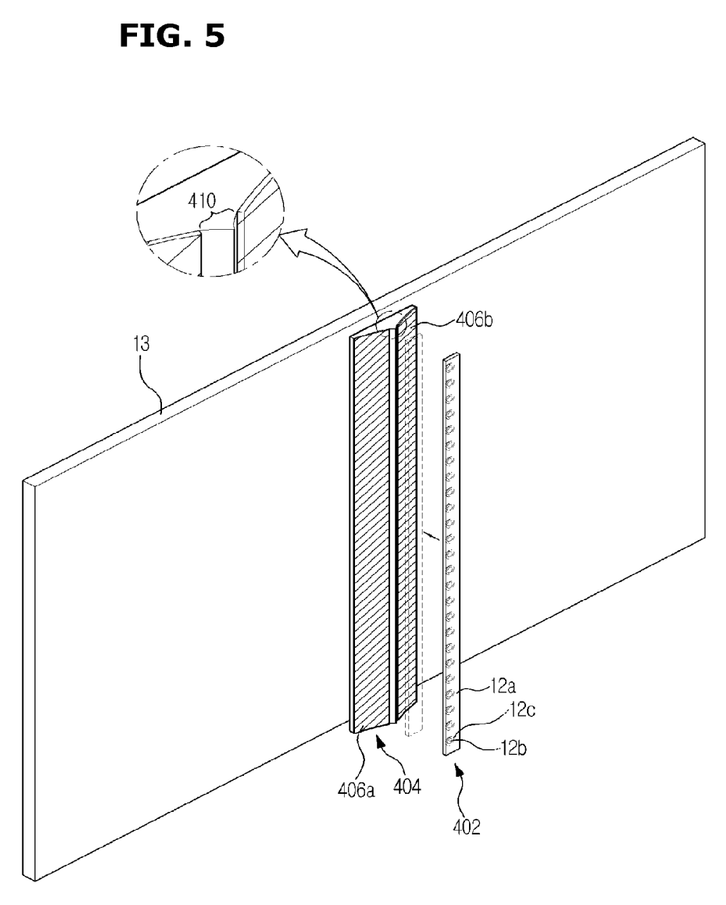
FIG. 5 is an exploded perspective view of a backlight unit of the display module in accordance with the embodiment of the present disclosure.
Figure 6:
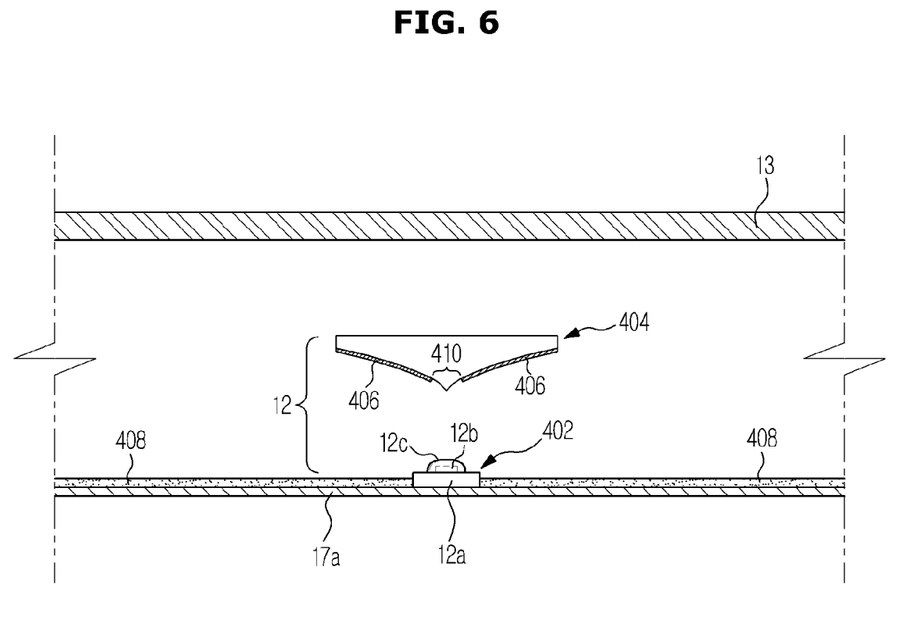
FIG. 6 is a view illustrating the detailed shape and configuration of the backlight unit of the display module in accordance with the embodiment of the present disclosure.

FIG. 5 is an exploded perspective view of the backlight unit of the display module in accordance with the embodiment of the present disclosure, and FIG. 6 is a view illustrating the detailed shape and configuration of the backlight unit of the display module in accordance with the embodiment of the present disclosure.

First, as exemplarily shown in FIG. 5, the light source 402 is installed at a position separated from the rear surface of the light diffuser 13 by a predetermined distance, and the lens unit 404 is installed between the light diffuser 13 and the light source 402. The light source 402 includes a plurality of optical elements (for example, a plurality of light emitting diodes), and is located at a position separated from the rear surface of the light diffuser 13 by a predetermined distance and corresponding to the central portion of the light diffuser 13. Further, the light source 402 is arranged in a long strip shape extended in the vertical direction of the light diffuser 13 and having a length equal to the vertical length of the light diffuser 13. The lens unit 404 is also arranged in a strip shape having a length similar to the length of the light source 402 according to the arrangement shape of the light source 402. Here, the 'vertical direction' refers to the direction of the shorter one of the horizontal length and the vertical length of the light diffuser 13.

The lens unit 404 of the display panel 11 has a surface facing the light diffuser 13 and a surface facing the light source 402. The surface of the lens unit 404 facing the light source 402 includes reflective areas 406 which are coated with a reflective material to reflect light and a transmissive area 410 which is not coated with a reflective material to transmit light. As exemplarily shown in FIG. 5, the transmissive area 410 of the lens unit 404 which is not coated with a reflective material is formed along the central axis in the lengthwise direction of the surface of the lens unit 404 facing the light source 402 to have predetermined width and length, and the reflective areas 406 which are coated with a reflective material are formed at both sides of the transmissive area 410. The reflective areas 406 may include a first reflective area 406a and a second reflective area 406b divided by the transmissive area 410. The first reflective area 406a and the second reflective area 406b of the reflective areas 406 are inclined symmetrically to each other in the direction of the light diffuser 13.

Further, as exemplarily shown in FIG. 6, the light source 402 of the backlight unit 12 includes a printed circuit board 12a provided with a conductive pattern forming an electrical circuit and arranged on the bottom chassis 17, light emitting diodes 12b installed on the printed circuit board 12a to face the light diffuser 13, and protective lids 12c to protect the light emitting diodes 12b. One light emitting diode 12b and one protective lid 12c form one optical element.

As exemplarily shown in FIG. 6, the cross-section of the lens unit 404 of the backlight unit 12 is formed in a substantially triangular shape that is inverted, if a region where the light source 402 is located is defined as the bottom and a region where the light diffuser 13 is located is defined as the top. In the inverted triangular cross-section of the lens unit 404, the reflective areas 406 are formed at portions corresponding to inclined sides (inclined planes of a 3D shape). The reflective areas 406 are not formed on the entirety of the inclined sides of the lens unit 404. That is, the reflective areas 406 are not formed at a central portion of the lens unit 404 close to the light source 402, i.e., a portion of the lens unit 404 corresponding to the transmissive area 410.

A part of light radiated from the light source 402 is incident upon the lens unit 404 through the transmissive area 410, and the proceeding path of incident light may be diffused by the action of the lens unit 404. Further, the remainder of light radiated from the light source 402 is reflected by the reflective areas 406, is again reflected by the reflective surface 408 formed on the inner surface of the bottom chassis 17 illustrated with reference to FIGS. 3 and 4, and then reaches the light diffuser 13.

The reason why the surface of the lens unit 404 facing the light source 402 is divided into the reflective areas 406 and the transmissive area 410 is as follows. If the lens unit 404 is not divided into the reflective areas 406 and the transmissive area 410 and the lens unit 404 is configured such that the entirety of the surface of the lens unit 404 facing the light source 402 is coated with a reflective material, light incident at an angle more than a critical angle is totally reflected, and light incident at an angle under the critical angle is transmitted, an amount of light totally reflected and an amount of light transmitted are determined according to accuracy in cutting of the lens unit 404, and thus precision machining of the lens unit 404 is required, a product manufacturing process becomes complicated, and manufacturing costs are increased.

However, if the reflective areas 406 which are coated with a reflective material and the transmissive area 410 which is not coated with a reflective material are formed on the surface of the lens unit 404 facing the light source 402, as in the lens unit 404 in accordance with the embodiment of the present disclosure, reflection and transmission of light may be achieved more conveniently, as compared to the precise lens cutting method. This may simplify a manufacturing process and reduce a process time, and thus product manufacturing costs may be greatly reduced.

Although FIGS. 5 and 6 illustrates the surface of the lens unit 404 facing the light source 402 as being formed in a curved shape, the reflective areas 406 may be formed in a spherical shape, an aspherical shape, or a flat surface to acquire light diffusing characteristics of a desired level in consideration of light transmission environments, such as the distance between the backlight unit 12 and the light diffuser 13 and the area of the light diffuser 13.

Figure 7:
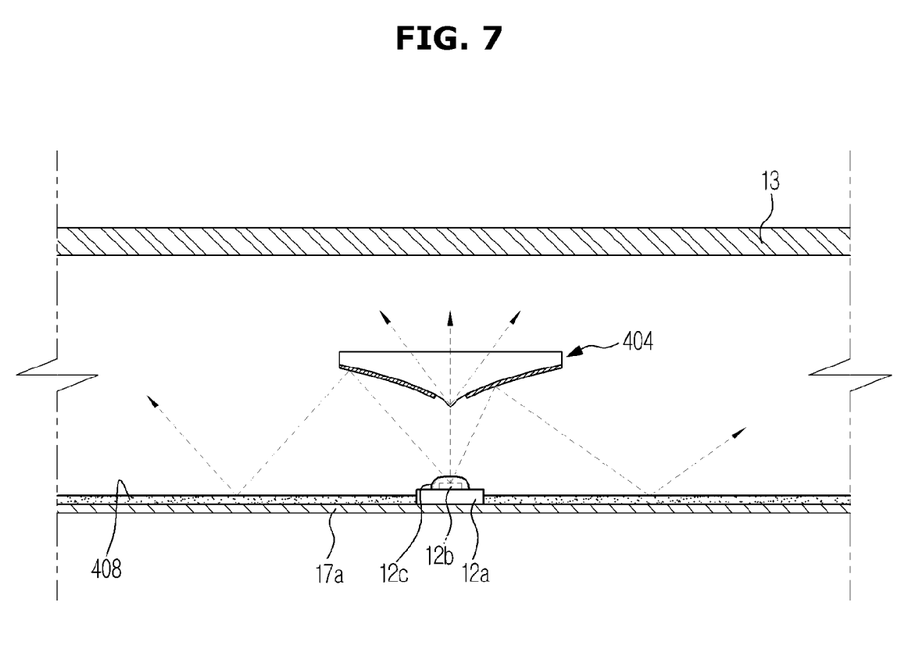
FIG. 7 is a view illustrating optical characteristics of the backlight unit in accordance with the embodiment of the present disclosure.

FIG. 7 is a view illustrating optical characteristics of the backlight unit in accordance with the embodiment of the present disclosure. In FIG. 7, in order to describe optical characteristics of the backlight unit 12, reference numerals of some elements which are the same as those in FIGS. 3 to 6 are omitted. As exemplarily shown in FIG. 7, a part of light radiated from the light source 402 may be transmitted to the light diffuser 13 through various paths through reflection by the reflective areas 406 and reflection by the inner surface 408 of the bottom chassis 17. Further, the remainder of light radiated from the light source 402 may be incident upon the lens unit 404 through the transmissive area 410 and be transmitted to the light diffuser 13 through various paths by the action of the lens unit 404.

In the backlight unit 12 in accordance with the embodiment of the present disclosure, the reflective areas 406 and the transmissive area 410 of the lens unit 404 may exhibit effects, as follows.

First, when the backlight unit 12 is located at the central region of the light diffuser 13, light diffusion efficiency may be improved and the number of optical elements (for example, LEDs) may be reduced, as compared to when the backlight unit 12 is located at the edge of the light diffuser 13. However, on the assumption that the entirety of the surface of the lens unit 404 facing the light source 402 forms a reflective area without a transmissive area, the reflective area blocks light radiated from the light source 402 and forms the shadow at the central region of the light diffuser 13, and a dark region is generated at the central region of the display panel 11 due to the shadow. This goes against the conditions of the display panel requiring uniform light distribution, and may thus be disadvantageous.

Therefore, by providing the transmissive area 410 on the lens unit 404 so that light is transmitted through the transmissive area 410 between the reflective areas 406, as in the backlight unit 12 in accordance with the embodiment of the present disclosure, the shadow which may be formed by the reflective areas 406 is compensated for by light transmitted by the transmissive area 410, and thus, a dark region generated due to the shadow of the reflective areas 406 may be eliminated. Because the dark region which may be generated when the backlight unit 12 is located at the central region of the light diffuser 13 is eliminated in such a manner, advantages (improvement of light diffusion efficiency and reduction in the number of optical elements) acquired if the backlight unit 12 is located at the central region of the rear surface of the light diffuser 13 may be sufficiently obtained.

Figure 8:
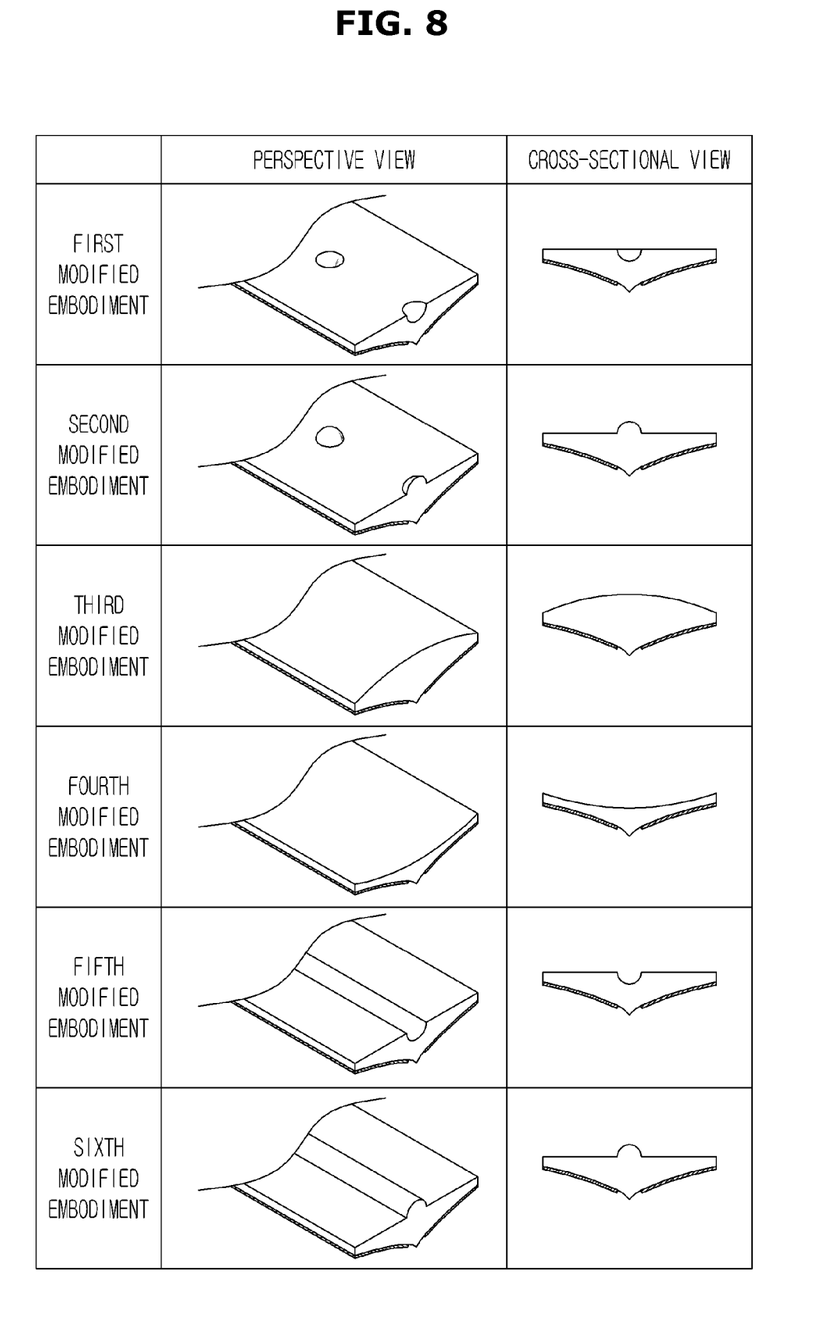
FIG. 8 is a view illustrating lens units of the backlight unit in accordance with various modified embodiments of the present disclosure.

FIG. 8 is a view illustrating lens units of the backlight unit in accordance with various modified embodiments of the present disclosure. As exemplarily shown in FIG. 8, light incident upon the lens unit 404 through the transmissive area 410 may be more widely diffused or more concentrated at some areas by variously modifying the surface of the lens unit 404 facing the light diffuser 13. Such light diffusion and concentration may serve to uniformly radiate light to the display panel 11.

In the first modified embodiment of FIG. 8, some parts of the surface of the lens unit 404 facing the light diffuser 13 are concave to alter the optical path and the light diffusion degree. The positions of the concave parts of the lens unit 404 may correspond to the positions of a plurality of optical elements of the light source 402. Further, the size of the concave parts of the lens unit 404 may correspond to the size of the plurality of optical elements of the light source 402, or may be greater than or smaller than the size of the plurality of optical elements of the light source 402. The curvature of the concave parts of the lens unit 404 may be determined according to a desired light diffusion degree and a desired optical path.

In the second modified embodiment of FIG. 8, some parts of the surface of the lens unit 404 facing the light diffuser 13 are convex to alter the optical path and the light diffusion degree. The positions of the convex parts of the lens unit 404 may correspond to the positions of the plurality of optical elements of the light source 402, or be located between two neighboring optical elements of the light source 402. Further, the size of the convex parts of the lens unit 404 may correspond to the size of the plurality of optical elements of the light source 402, or may be greater than or smaller than the size of the plurality of optical elements of the light source 402. The curvature of the convex parts of the lens unit 404 may be determined according to a desired light diffusion degree and a desired optical path.

In the third modified embodiment of FIG. 8, the entirety of the surface of the lens unit 404 facing the light diffuser 13 is convex to alter the optical path and the light diffusion degree. The curvature of the convex surface of the lens unit 404 facing the light diffuser 13 may be determined according to a desired light diffusion degree and a desired optical path.

In the fourth modified embodiment of FIG. 8, the entirety of the surface of the lens unit 404 facing the light diffuser 13 is concave to alter the optical path and the light diffusion degree. The curvature of the concave surface of the lens unit 404 facing the light diffuser 13 may be determined according to a desired light diffusion degree and a desired optical path.

In the fifth modified embodiment of FIG. 8, a long and concave groove is formed on the surface of the lens unit 404 facing the light diffuser 13 in the lengthwise direction of the lens unit 404 to alter the optical path and the light diffusion degree. The position of such a long and concave groove may correspond to the arrangement position of the plurality of optical elements of the light source 402. Further, the width and length of the long and concave groove may correspond to the size and arrangement length of the light source 402. The curvature of the inner surface of the concave groove may be determined according to a desired light diffusion degree and a desired optical path.

In the sixth modified embodiment of FIG. 8, a long and convex groove is formed on the surface of the lens unit 404 facing the light diffuser 13 to alter the optical path and the light diffusion degree. The position of such a long and convex groove may correspond to the arrangement position of the plurality of optical elements of the light source 402. Further, the width and length of the long and convex groove may correspond to the size and arrangement length of the light source 402. The curvature of the outer surface of the convex groove may be determined according to a desired light diffusion degree and a desired optical path.

Figure 9:
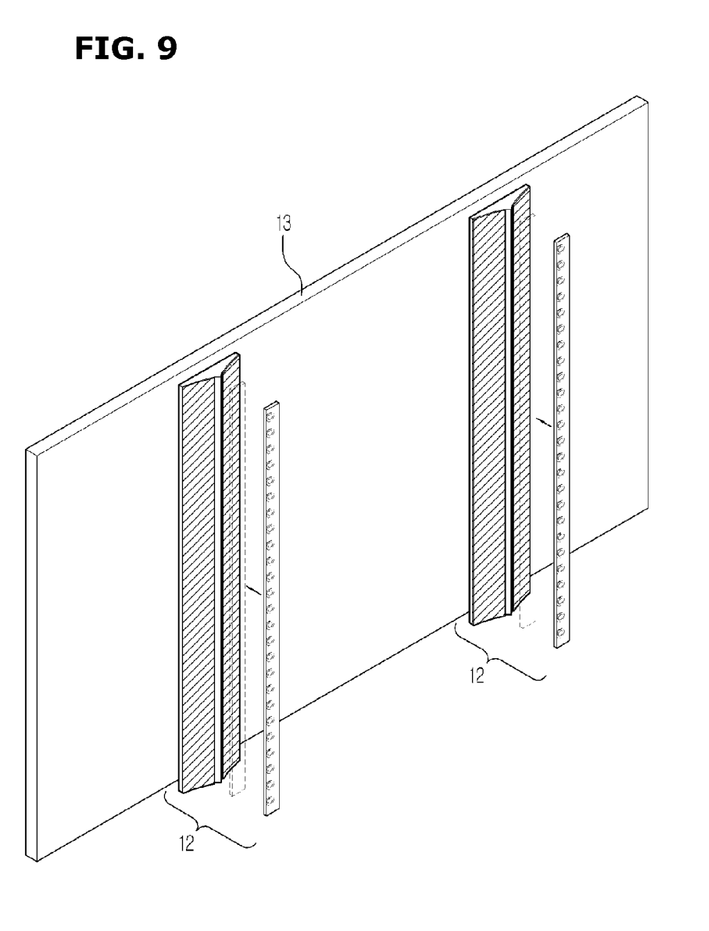
FIG. 9 is a view illustrating a backlight unit in accordance with an embodiment of the present disclosure.

FIG. 9 is a view illustrating a backlight unit in accordance with an embodiment of the present disclosure. As exemplarily shown in FIG. 9, a plurality of backlight units 102 is arranged at a position separated from the rear surface of a light diffuser 13 by a predetermined distance and corresponding to the central region of the light diffuser 13 in the vertical direction of the light diffuser 13 to have a length equal to the vertical length of the light diffuser 13. Here, the 'vertical direction' refers to the direction of the shorter one of the horizontal length and the vertical length of the light diffuser 13. If the horizontal length and the vertical length are the same, the vertical direction may be the horizontal direction.

Figure 10:
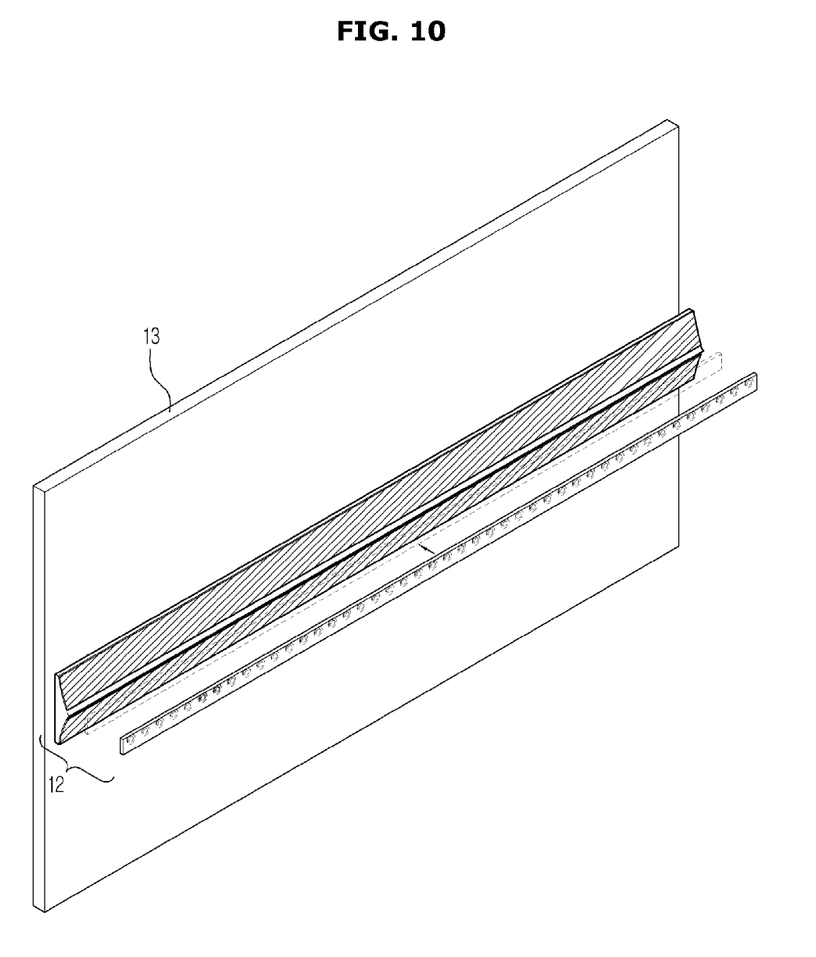
FIG. 10 is a view illustrating a backlight unit in accordance with an embodiment of the present disclosure.

FIG. 10 is a view illustrating a backlight unit in accordance with an embodiment of the present disclosure. As exemplarily shown in FIG. 10, one backlight unit 12 is arranged at a position separated from the rear surface of a light diffuser 13 by a predetermined distance and corresponding to the central region of the light diffuser 13 in the horizontal direction of the light diffuser 13 to have a length equal to the horizontal length of the light diffuser 13. Here, the 'horizontal direction' refers to the direction of the longer one of the horizontal length and the vertical length of the light diffuser 13. If the horizontal length and the vertical length are the same, the horizontal direction may be the vertical direction.

Figure 11:
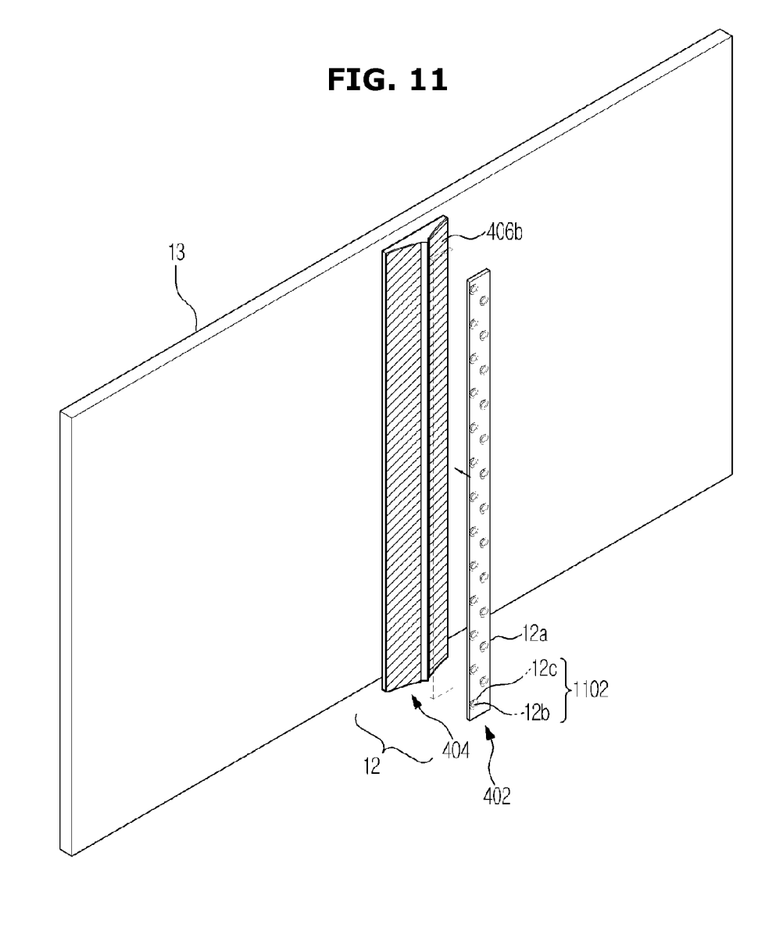
FIG. 11 is a view illustrating a backlight unit in accordance with an embodiment of the present disclosure.

FIG. 11 is a view illustrating a backlight unit in accordance with a further modified embodiment of the present disclosure. As exemplarily shown in FIG. 11, a plurality of optical elements 1102, each of which includes a light emitting diode 12b and a protective lid 12c, is installed on a printed circuit board 12a forming a light source 402 of a backlight unit 12. Here, the plurality of optical elements 1102 may be arranged in a zigzag pattern. If the optical elements 1102, provided in number equal to the number of the optical elements 1102 arranged in a line in the backlight unit 12 shown in FIG. 2, are arranged in a zigzag pattern, as exemplarily shown in FIG. 11, light radiated from the backlight unit 12 may reach more distant positions on the light diffuser 13 in the horizontal direction (the direction of the longer one of the horizontal length and the vertical length) of the light diffuser 13, and the backlight unit 12 of FIG. 11 using the same number of the optical elements 1102 may acquire higher light transmission characteristics than the backlight unit 12 of FIG. 5 in terms of light diffusion.

As is apparent from the above description, a display device using a display panel in accordance with an embodiment of the present disclosure includes a backlight unit to radiate light to the display panel installed at the central region of the rear surface of the display panel, and may thus radiate light to the entirety of a light diffuser using only a small number of optical elements without a light guide plate. Further, the display device may eliminate generation of the shadow of the backlight unit through reflective areas and a transmissive area of a lens unit.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A backlight unit for a display device, the backlight unit comprising:
   a light source; and
   a lens unit optically coupled to the light source, and comprising a surface facing the light source, the surface of the lens unit facing the light source comprising a reflective area coated with a reflective material and reflecting a part of the light radiated from the light source, and a transmissive area transmitting the other part of the light radiated from the light source.

2. The backlight unit according to claim 1, wherein the lens unit has a surface opposite the light source, and the surface of the lens unit opposite the light source is flat.

3. The backlight unit according to claim 1, wherein the lens unit has a surface opposite the light source, and the entirety of surface of the lens unit opposite the light source is convex.

4. The backlight unit according to claim 1, wherein the lens unit has a surface opposite the light source, and the entirety of surface of the lens unit opposite the light source is concave.

5. The backlight unit according to claim 1, wherein the lens unit has a surface opposite the light source, and a long and concave groove is formed on the surface of the lens unit opposite the light source in the lengthwise direction of the lens unit.

6. The backlight unit according to claim 1, wherein the lens unit has a surface opposite the light source, and a long and convex protrusion is formed on the surface of the lens unit opposite the light source.

7. The backlight unit according to claim 1, wherein:
   the light source comprises a plurality of optical elements; and
   the lens unit is provided to correspond to the plurality of optical elements.

8. The backlight unit according to claim 1, wherein:
   the light source comprises a plurality of optical elements arranged in a long strip along a longitudinal axis of the light source; and
   the lens unit is arranged in a long strip shape substantially parallel to the longitudinal axis of the light source.

9. The backlight unit according to claim 8, wherein the plurality of optical elements are arranged substantially parallel to one of a longitudinal axis and a latitudinal axis a light diffuser.

10. The backlight unit according to claim 8, wherein:
    the plurality of optical elements are arranged in the shape of two parallel strips substantially parallel to the longitudinal axis of the light source; and
    the lens unit is arranged in the shape of two parallel strips arranged substantially parallel to the plurality of optical elements.

11. The backlight unit according to claim 8, wherein the plurality of optical elements are arranged in the shape of two parallel strips in a zigzag pattern substantially parallel to the longitudinal axis of the light source.

12. The backlight unit according to claim 1, wherein the lens unit has a surface opposite the light source, and some parts of the surface of the lens unit opposite the light source are concave.

13. The backlight unit according to claim 12, wherein the positions of the concave parts coincide with the positions of a plurality of optical elements of the light source.

14. The backlight unit according to claim 12, wherein the size of the concave parts coincides with the size of a plurality of optical elements of the light source.

15. The backlight unit according to claim 12, wherein the size of the concave parts is greater than or smaller than the size of a plurality of optical elements of the light source.

16. The backlight unit according to claim 1, wherein the lens unit has a surface opposite the light source, and some parts of the surface of the lens unit opposite the light source are convex.

17. The backlight unit according to claim 16, wherein the positions of the convex parts coincide with the positions of a plurality of optical elements of the light source.

18. The backlight unit according to claim 16, wherein the size of the convex parts coincides with the size of a plurality of optical elements of the light source.

19. The backlight unit according to claim 16, wherein the size of the convex parts is greater than or smaller than the size of a plurality of optical elements of the light source.

20. The backlight unit according to claim 1, wherein the transmissive area is formed along the central axis in the lengthwise direction of the surface of the lens unit facing the light source, and the reflective area is formed around the transmissive area.

21. The backlight unit according to claim 20, wherein the reflective area on the surface of the lens unit facing the light source has a predetermined curvature.

22. The backlight unit according to claim 20, wherein the reflective area comprises a first reflective area and a second reflective area divided from each other by the transmissive area, and the first reflective area and the second reflective area are inclined symmetrically to each other.

23. The backlight unit according to claim 22, wherein the first reflective area and the second reflective area are inclined.

24. A display device comprising:
a display panel to display an image;
a light diffuser installed behind the display panel to diffuse light;
a bottom chassis installed behind the light diffuser and provided with a reflective surface on a surface of the bottom chassis facing the light diffuser;
a light source installed between the light diffuser and the bottom chassis to be separated from the light diffuser by a predetermined distance, and radiating light to the light diffuser; and
a lens unit installed between the light diffuser and the light source, and comprising a surface facing the light source, the surface of the lens unit facing the light source comprising a reflective area coated with a reflective material and reflecting a part of light radiated from the light source, and a transmissive area transmitting the other part of light radiated from the light source.

25. The display device according to claim 24, wherein a part of light radiated from the light source is reflected by the reflective area of the lens unit, and is then reflected by the reflective surface of the bottom chassis.

26. The display device according to claim 24, wherein:
the light source comprises a plurality of optical elements;
the plurality of optical elements are arranged in a long strip shape in parallel with the rear surface of the light diffuser; and
the lens unit is arranged in a long strip shape along the arrangement shape of the plurality of optical elements.

27. The display device according to claim 24, wherein the lens unit has the surface facing the light source, the transmissive area is formed along the central axis in the lengthwise direction of the surface of the lens unit facing the light source, and the reflective area is formed around of the transmissive area.

28. The display device according to claim 24, wherein:
the light source comprises a plurality of optical elements; and
the lens unit is provided to correspond to the plurality of optical elements.

29. A display apparatus comprising:
a display panel; and
a backlight unit providing diffused light to the display panel, the backlight unit comprising:
a light emitter;
a light diffuser;
a reflective surface; and
a lens provided between the light diffuser and the reflective surface, and comprising a transmissive area and a reflective area provided on a surface of the lens facing the light emitter,
wherein the lens is arranged to transmit a first portion of the emitted light through the transmissive area to the light diffuser, and reflect a second portion of the emitted light from the reflective area to the reflective surface and then to the light diffuser.

30. The display apparatus of claim 29, wherein the lens is provided in a substantially triangular shape.

* * * * *